Jan. 21, 1941.  C. M. BAILEY  2,229,543
SAFETY SHUT-OFF VALVE
Filed Oct. 6, 1939
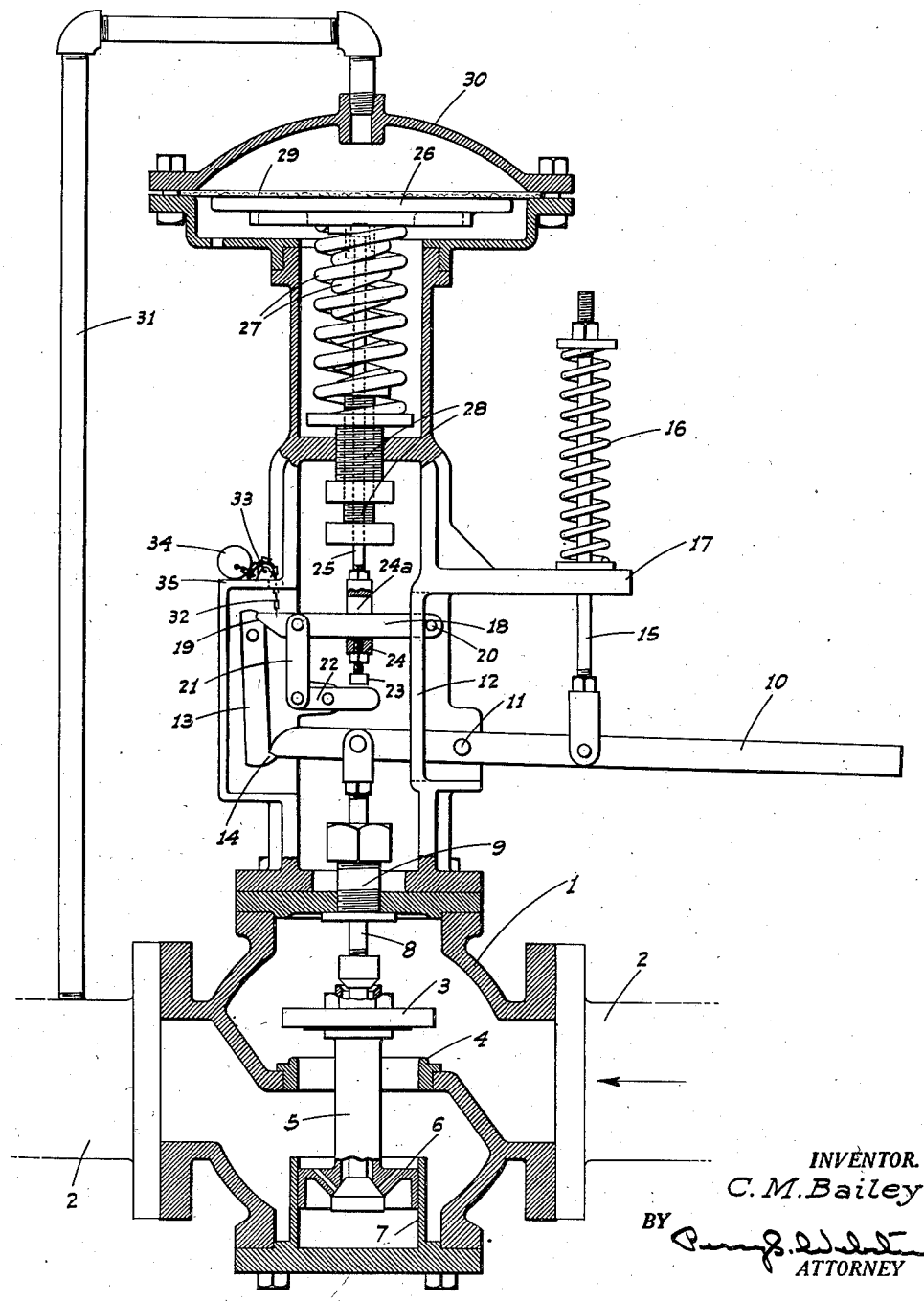
INVENTOR.
C. M. Bailey
BY
ATTORNEY Patented Jan. 21, 1941

2,229,543

UNITED STATES PATENT OFFICE 2,229,543

SAFETY SHUT-OFF VALVE

Charles Morgan Bailey, San Francisco, Calif., assignor to Chas. M. Bailey Co., Inc., San Francisco, Calif., a corporation of California Application October 6, 1939, Serial No. 298,261

8 Claims. (Cl. 137—139)

This invention relates to safety valves for use in high pressure gas or similar pipe lines, the principal object being to provide a valve for the purpose adapted to be interposed in the line in normally open condition, and having control means arranged to function to automatically cause the valve to close either by reason of excessively high pressure in the line, or by reason of a failure of such pressure as might be caused by a break in the line or by the pressure being inadvertently shut off at the source.

A further object is to provide an attachment which acts on this control means to cause the closing of the valve whenever the same is subjected to a severe shock such as an earthquake or near-by explosion regardless of the pressure conditions in the line, and which shock might cause breakage of the line beyond the valve and the escape of gas with possible disastrous consequences.

These objects are accomplished by means of such structure and relative arrangement of parts as will fully appear by a perusal of the following specification and claims.

The figure on the drawing is an elevational view, mainly in section, of the improved valve in its normal open and set position.

Referring now more particularly to the characters of reference on the drawing, the structure comprises a globe valve body 1 adapted to be interposed in a pipe line 2 preferably near the source of supply. A vertically movable disc valve is disposed in the body above its cooperating seat 4, the valve having a depending stem 5 provided at the bottom with a dash pot device 6 which includes a guide cup 7 secured on the bottom of the body.

An operating stem 8 projects upwardly from and is connected to the stem 5, the stem 8 passing through a packing gland 9 on the top of the body and being connected at its upper end to a substantially horizontal lever 10. This lever is pivoted intermediate its ends, as at 11, on a cage or frame work 12 upstanding from and mounted on the body 1.

A trigger 13 is pivoted adjacent its upper end on the cage and has a lip 14 on its lower end adapted to engage under the adjacent end of the lever 10; the latter being then held in a position such as to maintain the valve disc 3 in a raised and open position as shown. An upstanding pull rod 15 is connected to the lever at a point beyond the pivot 11 on the side thereof opposite the stem 8 and is yieldably pulled upward by an adjustable compression spring 16 supported by a bracket 17 projecting from the cage 11 above the lever.

A substantially horizontal holding arm 18 is disposed in the cage above and lengthwise of the lever 10, said arm at one end engaging a seating notch 19 cut in the edge of the trigger 13 at the top and on the same side as the lip 14; said arm being pivoted at its opposite end on the cage as at 20. A depending link 21 is pivoted on the arm 18 near its trigger engaging end and on one end of a short horizontal lever 22 disposed under the arm 18; this lever being pivoted intermediate its ends on the cage. The free end of the lever 22 extends under a head 23 mounted for vertical adjustment on the lower end of a yoke 24 which slidably embraces the arm 18 between its pivot and the link 21. This yoke is connected to an upstanding stem 25 which is connected at its upper end to the under side of a relatively large disc 26 axially thereof. This disc is yieldably pressed upward by springs 27 whose effectiveness may be independently adjusted by adjusting screws 28 surrounding the stem 25.

Directly above and engaging the disc is a diaphragm 29 secured about its periphery between the top and bottom members of a housing 30 supported from the cage and which above the diaphragm forms a pressure tight enclosure therewith.

A pressure equalizing pipe 31 extends between and is connected to said housing above the diaphragm and other pipe 2 beyond or on the outlet side of the valve.

A flexible member such as a chain 32 is connected to the arm 18 and passes upward over a guide roller 33 mounted on the cage to a connection with a relatively heavy ball 34. This ball normally rests on a horizontal ledge 35 formed on the cage, said ledge being relatively shallow so that a shock will cause the ball to roll off the ledge and drop freely.

In operation, with the valve in its normal open position the lever 10 is engaged with the trigger 13 and the holding arm 18 is also engaged with the trigger, thus preventing the latter from swinging at its lower end away from the lever 10 and preventing the valve closing pull of the spring 16 on the rod 15 from being effective. The springs 27 are adjustable to counter-balance the desired normal line pressure on the diaphragm so that the yoke 24 is held with the head 23 close to but clear of the lever 22, while the bottom of the yoke slot 24a is close to but clear of the bottom of the holding arm 18 as shown in the drawing.

If, therefore, the pressure in the line becomes excessive, such pressure passes through the pipe 31 to the housing 30 above the diaphragm depressing the latter against the resistance of the springs 27. The head 23 therefore engages and depresses the adjacent end of the lever 22, raising the link 21 and tripping the holding arm 18 from the notch 19 of the trigger.

The lip 14 and the engaged edge of the lever 10 are cut on a downward slant so that the downward pressure of said end of the lever against the lip due to the action of spring 16 causes the trigger to be swung clear of the lever and allows the latter to drip at its adjacent end, thus closing the valve 3.

If, on the other hand, the pressure in the line should fail for any reason, the pressure above the diaphragm is correspondingly lowered and the springs 27 then act to force the diaphragm and disc 26 upwardly. This pull-up on the stem 25 and the yoke 24 pulls up on the arm 18, thus releasing the same from the trigger in the same manner as was accomplished by the upward pressure of the link 21 as previously described, and of course with the same result.

Should the pressure conditions in the line remain undisturbed by the valve but subjected to an earth quake or explosion shock such as might be calculated to break the line, the valve is again closed by the falling of the ball 34 off the ledge 35. This imparts an upward pull on the portion of the chain 32 connected to the arm 18 and thus pulls the arm 18 upward to a trigger releasing position, with the resultant valve closing action before described.

After the valve has been once closed it must be manually reopened when the proper pressure conditions in the intake side of the valve have been restored. This is done by depressing the outer end of the lever 10 until it engages the trigger and holding the lever thus depressed until the pressure in housing 30 above the diaphragm returns to normal and counter-balances the springs 27.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, what is claimed as new and useful and is desired to be secured by Letters Patent is:

1. A safety shut-off device for a pressure pipe line comprising a valve body adapted to be interposed in the line, a normally open valve in the body, means tending to close the valve, holding means normally preventing said closing means from functioning, means actuated by abnormal pressure conditions within the body to release the holding means and means to independently release the holding means by shock applied to the body.

2. A safety shut-off device for a pressure pipe line comprising a valve body adapted to be interposed in the line, a normally open valve in the body, means tending to close the valve, holding means normally preventing said closing means from functioning, said holding means including a pivoted trip arm movable in one direction to release the holding means, a weighted ball, a horizontal shallow ledge mounted with the valve body and on which the ball normally rests, a flexible element connecting the ball and trip arm, and a guide member for said element mounted in fixed connection with the body and in such relation to the ball and arm that when said ball rolls off the ledge, the element will pull the arm in said one direction.

3. A safety shut-off device for a pressure pipe line comprising a valve body adapted to be interposed in the line, a normally open valve in the body, a spring loaded member operatively connected to the valve and tending to move in a direction to close the same, a releasable trigger applied to the member to normally prevent such movement of the same, means applied to the trigger to normally hold the same against release, a diaphragm unit mounted in connection with the body, means to apply line pressure against one face of the unit, spring means applied against the opposite face of the unit and acting in normally counter-balancing opposition to the pressure and a mechanism between the unit and trigger holding means to release the same by unbalancing movement of the unit due to excess line pressure relative to spring pressure, and means included in part with said mechanism to release the holding means by unbalancing movement of the unit due to excess spring pressure relative to line pressure.

4. A safety shut-off device for a pressure pipe line comprising a valve body adapted to be interposed in the line, a normally open valve in the body, a spring loaded member operatively connected to the valve and tending to move in a direction to close the same, a releasable trigger applied to the member to normally prevent such movement of the same, a holding arm pivoted in connection with the body and engaging at its free end with the trigger to normally hold the same against release, said arm being movable in one direction to effect such release, a yoke embracing the arm, a stem projecting from the yoke in the direction of release movement of the arm, a diphragm unit connected axially with the outer end of the stem, a spring applied against one face of the unit and tending to move the unit and stem in a direction to cause the arm to be moved in a release direction, and means to apply line pressure against the opposite face of the unit; the spring being set to counter-balance normal line pressure.

5. A structure as in claim 4, with means between the yoke and holding arm to release the latter by movement of the stem in a direction opposite to that of the release movement of the arm.

6. A structure as in claim 4, with means between the yoke and holding arm to release the latter by movement of the stem in a direction opposite to that of the release movement of the arm, such last named means comprising a lever pivoted intermediate its ends in connection with the valve body and extending lengthwise of the holding arm beyond the yoke, an element on the yoke to engage one end of said lever and a link connecting the opposite end of the lever and said holding arm.

7. A safety shut-off device for a pressure pipe line comprising a valve body adapted to be interposed in the line, a normally open valve in the body, a spring loaded member operatively connected to the valve and tending to move in a direction to close the same, a releasable trigger applied to the member to normally prevent such movement of the same, a holding arm pivoted in connection with the body and engaging at its free end wtih the trigger to normally hold the same against release, said arm being movable in one direction to effect such release, a stem projecting from the yoke in the direction of release movement of the arm, a diaphragm unit connected axially with the outer end of the stem, a spring applied against one face of the unit, means to apply line pressure against the opposite face of the unit and counter-balancing the spring, a lever pivoted intermediate its ends in connection with the valve body and extending substantially parallel to the holding arm, an element fixed with the stem to engage and depress one end of the lever upon movement of the stem in a direction opposite that of the release movement of the arm and a link connecting the opposite end of the lever and said holding arm.

8. A structure as in claim 7, with a member mounted in connection with the stem to directly engage and move the holding arm in said release direction upon movement of the stem in the same direction.

CHARLES M. BAILEY.